United States Patent

Jauvtis

[15] 3,641,523

[45] Feb. 8, 1972

[54] MAGNETIC DOMAIN CIRCULATING SHIFT REGISTER

[72] Inventor: Harvey I. Jauvtis, Belmont, Mass.

[73] Assignee: The United States of America as represented by the Secretary of the Air Force

[22] Filed: Dec. 31, 1969

[21] Appl. No.: 889,371

[52] U.S. Cl..............340/174 SR, 340/174 TF, 340/174 QA, 340/174 LA

[51] Int. Cl.....................................G11c 21/00, G11c 11/14

[58] Field of Search.................340/174 TF, 174 FB, 174 ZB, 340/174 LA

[56] References Cited

UNITED STATES PATENTS 3,438,016 4/1969 Spain....................................340/174

*Primary Examiner*—James W. Moffitt

*Attorney*—Harry A. Herbert and Julian L. Siegel

[57] ABSTRACT

A magnetic domain circulating shift register in which magnetic channels are in a continuous zigzag configuration and magnetic domain diodes are positioned in each channel branch to obtain single direction of propagation. Fan outs from alternating branch channels through a film-to-film transfer junction into a second film inhibit propagation in adjacent branch channels while an interlacing hold conductor permits selective erasure.

3 Claims, 3 Drawing Figures

INVENTOR
HARVEY I. JAUVTIS
BY Harry A. Herbert Jr and
Julian L. Siegel
ATTORNEYS INVENTOR.
HARVEY I. JAUVTIS
BY Harry A. Herbert Jr.
Julian L. Siegel
ATTORNEYS

MAGNETIC DOMAIN CIRCULATING SHIFT REGISTER

BACKGROUND OF THE INVENTION

This invention relates to magnetic domain shift registers and more particularly to a circulating shift register.

The thin-film technique, called domain tip propagation logic (DTPL), makes use of the controlled growth of domains which are confined to a pattern of narrow, low coercive force channels embedded in a film element of generally high coercive force. Information is stored within regions of the low coercive force channels in the form of domains of reversed magnetization and propagated through the channels under the influence of an applied field by expansion of the domains at the domain tips. In this manner it is possible to control the direction of domain tip propagation and the mutual interaction between domain tips within channels brought into proximity of each other. The dependence of the direction of domain tip propagation upon the magnitude and direction of the applied field, the magnetostatic forces between neighboring domain tips, and the speed of domain tip propagation are such as to allow the construction of a wide variety of magnetic thin-film devices.

As a result of the geometry of the low coercive force channels, the direction of domain tip propagation is sensitive to the magnitude and direction of the applied field. This has made it possible to design new types of thin-film shift registers which are of essentially unlimited length and high storage density and speed.

Magnetostatic interactions between channeled domain tips make any combinational operation possible and information transfer, besides occurring without loss, is possible with what is essentially unlimited fanout so that there is no need for regeneration in building up large complexes of logic. The restriction of reversal of the magnetization to small regions of film permits a high density of memory and logic elements.

The term "domain tip propagation," is used to describe magnetization reversal which occurs by growth of a domain of reversed magnetization in the vicinity of the spikelike extremity of the domain as opposed to the sidewise expansion of the boundaries. The direction of domain tip propagation is sensitive to the direction of the applied field causing switching. Tip propagation can be directed to one side of the easy axis or to the other, depending upon the sense of the hard axis component of the drive field.

In addition, there are stray magnetic fields associated with the domain tips as a result of the nonzero divergence of the magnetization vector within the transition region separating opposing magnetizations. The source of the stray field surrounding a domain tip resembles a unipolar accumulation of "magnetic charge," the charge of opposite sign located at the opposite end of the long, narrow domain formed by the propagated tip. Domain tips which grow in the same easy axis direction have a net charge of the same sign while the charge of tips growing in opposite easy axis directions are of opposite sign. The tendency is, thus, for domain tips propagated in the same direction to repel each other and for those propagated in opposite directions to attract each other.

From a study of domain tip propagation, a new technique for the performance of thin-film, all-magnetic logic has emerged. The velocity of domain tip propagation has been observed to attain values as great as $10^6$ cm./s. The speed and directionality of propagation and the stray field strength of domain tips suggest that this mode of domain growth, properly controlled, is adaptable to a great variety of logical operations of a new and yet unexploited nature.

In order to provide a reliable control over the direction of tip propagation for the purpose of device fabrication, it is possible to build into the magnetic film element channels of low coercive force through which domain tips can travel. The magnetic material outside these channels is of high coercive force so that switching of the magnetization is restricted to within the low coercive force channels by the growth of domains of reversed magnetization at the domain tips. The high coercive force material external to the propagation channels, in addition to restricting flux reversal to a particular pattern of low coercive force paths, plays a most important role in providing continuity of magnetization at the channel edges and thus inhibiting the spontaneous nucleation of unwanted domains within the low coercive force channels.

The necessary increase in film coercivity outside the propagation channels is easily provided by evaporating a thin layer of aluminum prior to the deposition of the magnetic film. The aluminum underlayer is extremely effective in causing an increase in coercive force of the overlying magnetic film. Through the use of photoetching techniques the aluminum film can be removed in regions which are to become the low coercive force channels for tip propagation with the result that the subsequently evaporated magnetic film will be of high coercive force except in regions where removal of the aluminum has taken place. Film coercivity in regions overlying the aluminum is markedly greater. A variety of other techniques can be used to achieve an equivalent result.

The use high coercive domain tip propagation in thin-film devices combines the lossless characteristic of domain wall motion with the speed of domain tip growth. DTPL shift registers have been used in the past in which a magnetic thin-film is prepared which is, for the most part, of high coercive force, except for a zigzag length of channel. The magnetic material within the channel is of low coercive force, such that for the magnitude of fields applied during the operation of the shift register it is only that portion of the film which is susceptible to being switched. The magnetization is initially saturated along an easy axis direction. A small reversed domain representing a bit of information is introduced into a region of intersection of adjacent segments of the low coercive force channel. A uniform field is then applied at some angle to the easy axis to cause growth of the reversed domain from the domain tip along one of the channel segments. The channel segment selected for domain growth is determined by the direction of the hard axis component of the applied field. Domain tip growth proceeds in the channel segment in one direction of the initial location of the reversed domain. Had the hard axis component of the applied field been of the opposite sense, domain tip propagation would have been in the other direction. A field is applied to restore the unswitched state of magnetization in the upper portion of the channel, while leaving a small reversed domain in the lower portion of the channel at the intersection of neighboring channel segments where the propagation of the domain tip ended. This is accomplished by furnishing an applied field whose strength decreases toward the lower portion of the zigzag channels. An inhibit conductor running beneath the lower bit locations is used for this purpose. The next step in shifting the information-bearing domain involves the application of a switching field, but with the hard axis component of the applied field reversed. This causes the propagation of the domain tip back toward the upper boundary of the channel with an additional shift of the position of the domain tip to the right. A field is finally applied which shrinks the domain back around its location in the upper portion of the channel, completing the shifting operation. By making use of an inhibit conductor which passes under the upper bit locations, the strength of this last applied field is made to be of decreasing magnitude toward the upper portion of the register so as to accomplish this step.

Since fields which are well below that required for the nucleation of new domains are sufficient for the propagation of domain tips, it is only the propagation of existing information-bearing domains which occurs without introduction of extraneous information. Electrical entry of information is made possible by providing a nucleate conductor at the input bit location.

Information, once shifted along the entire length of the zigzag channel, is easily made to return along an adjacent parallel channel.

SUMMARY OF THE INVENTION

An improved circulating shift register is presented here, in which drive pulses propagate a domain tip up and down in a zigzag channel with the direction of propagation restricted by magnetic domain diodes. The forward action of the domain is terminated by the action of inhibit gates which fan out from adjacent branch channels.

It is an object of the invention to provide a novel magnetic domain shift register.

It is another object to provide a reliable and improved shift register offering a simpler construction to that used in the past.

It is still another object to provide a magnetic domain circulating shift register using a minimum number of inhibit gates.

These and other advantages, features and objects of the invention will become more apparent from the following description taken in connection with the illustrative embodiment in the accompanying drawings, wherein:

DETAILED DESCRIPTION OF THE PREFERRED EMBODIMENT

Figure 1:
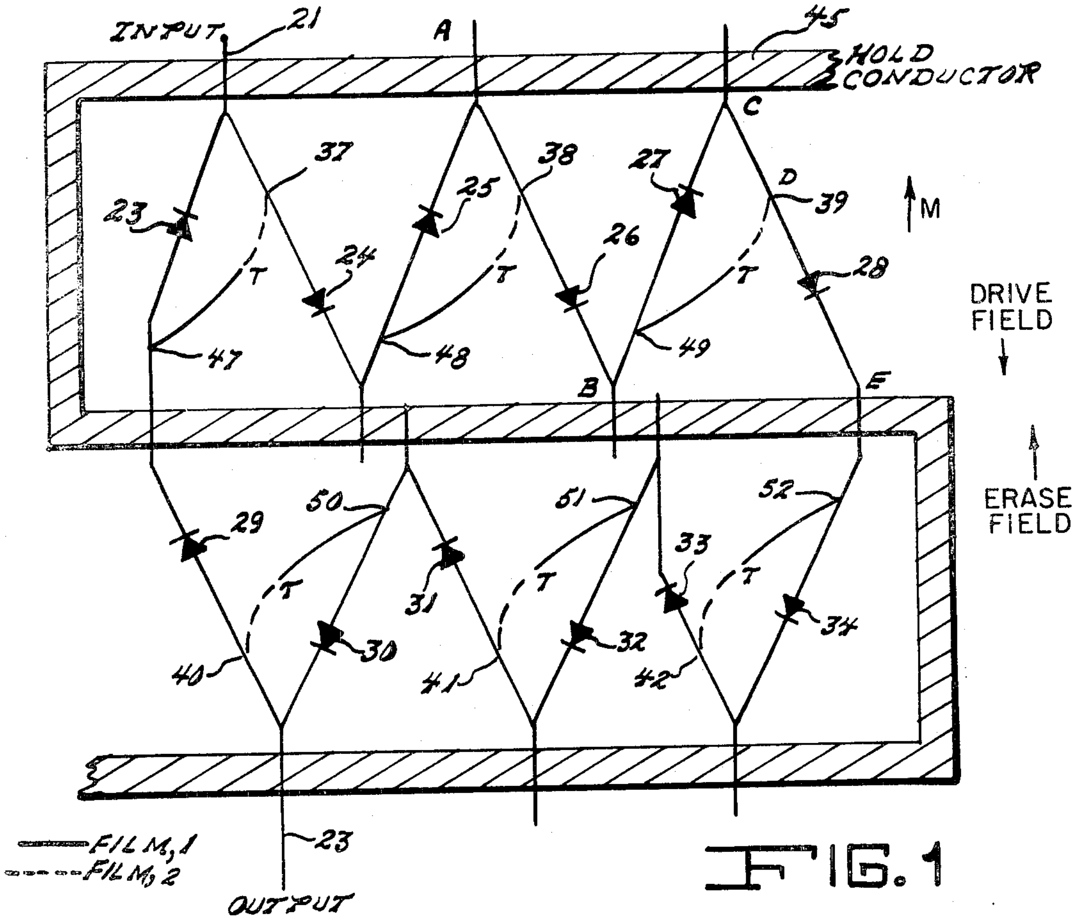
FIG. 1 shows a circulating shift register forming an embodiment of the invention.

Referring to FIG. 1, which shows the magnetic domain circulating shift register constructed on two films, the solid lines represent the channels of Film 1 and the broken lines represent the channels of Film 2. In both films the channels are areas of low coercive force surrounded by areas of high coercive force. A magnetic domain can be transferred from one film to another, because of the nonzero divergence or stray magnetic field of a domain, to nucleate a new domain in a channel in close proximity. This takes place at points designated as T.

This invention utilizes logical networks which are read out as a series of main channels and a series of control channels. The state of magnification of the control channels affects the propagation of the reverse domains along the main channels. Basically there are two types of interaction, i.e., inhibiting interaction and a nucleating interaction. In the inhibiting interaction the propagation of the domain of reversed magnetization along the main channel is inhibited by the presence of a domain of reversed magnetization in an appropriately positioned control channel with the magnitude and direction of the stray field from the inhibiting channel being sufficient to lower the field in the adjacent main channel below the value necessary to sustain propagation of the domain of reversed magnetization along it.

Figure 2:
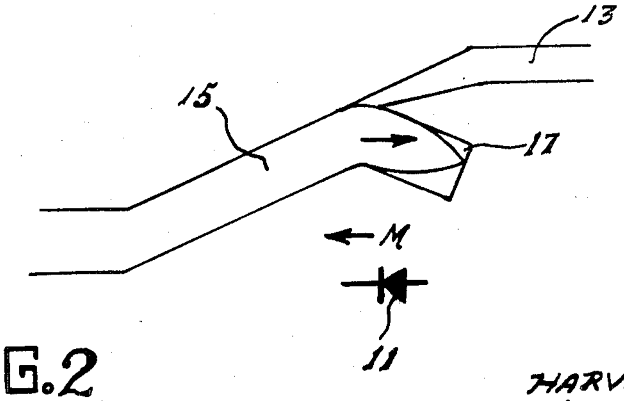
FIG. 2 is a schematic of a domain diode used in FIG. 1.

The shift register uses magnetic domain diodes to control the direction of propagation. Such a diode is shown in FIG. 2 in which the propagation is permitted only in the direction denoted by diode symbol 11. A domain can be freely propagated from channel 13 to channel 15 but if propagation is attempted in the opposite direction, because of the geometry of the channel and the domain, the domain will be directed into pocket 17. Consequently, propagation is permitted only in one direction.

The input can be nucleated at point 21 and then shifted in a circulating manner about the entire shift register. An output can be taken at point 23. Regardless of the direction of the propagating field, propagation of the domain will be confined to a single direction due to the action of diodes 23 to 34. Inhibit gates 37 to 42 formed by the interaction of two channels, one each in Film 1 and Film 2, prevent passage of a domain in the channel when desired. These gates result from fan out from the main channels shown at 47 to 52. Current is applied to hold conductor 45 in a layer outside of Film 1 and Film 2. This current produces a magnetic field which retains domains in certain positions of the shift register during the application of an erase field and in other positions permits an erasure. Because hold conductor 45 reverses its direction, the erase magnetic field also reverses its direction and thereby allows selective erasure.

Figure 3:
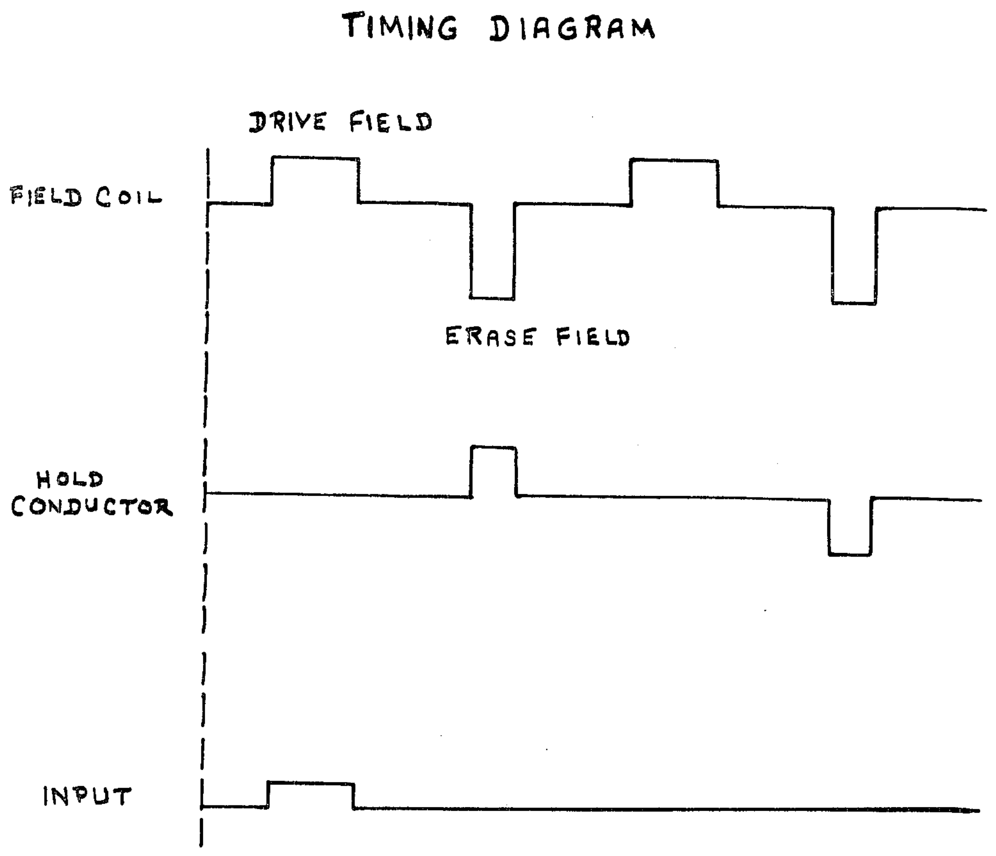
FIG. 3 is a timing diagram useful in the explanation of the invention.

An operation of the circulating shift register will now be explained. A domain to be initially held at location A will during the next drive pulse (which reduces a drive field in the direction shown by the arrow in FIG. 1) be propagated past locations B and C and come to rest at location D due to the action of inhibit gate 39, the latter containing a domain via fan out 49 and a film-to-film transfer junction. The domain comes to rest at D not the point 38 because there is no inhibit domain inhibit gate at point 38 at that time but there is one at D because it was derived from A through diode 26 and branched at 49. Since the subsequent hold operation occurs at location B the information at locations C and A will be erased. Thus, even though extended propagation past location B does occur, the domain tip never reaches location E and no error results. A normal propagate cycle follows during which the tip from location B is inhibited at location D and then held at location C. A timing diagram is presented in FIG. 3 which shows the timing sequence of this operation.

The methods and apparatus for nucleation, readout, propagation, et cetera are conventional and well known in the art.

Although the invention has been described with reference to a particular embodiment, it will be understood to those skilled in the art that the invention is capable of a variety of alternative embodiments within the spirit and scope of the appended claims.

I claim:

1. A magnetic domain circulating shift register having channels in a first film of low coercivity surrounded by regions of high coercivity of the same film, comprising:
   a. a pair of channels each channel having a plurality of branch channels with the branch channels being connected together to form vertices in a zigzag configuration, with the pair of channels paralleling and opposing each other and interconnected at the extremities of the pair forming a continuous channel;
   b. a plurality of magnetic domain diodes one each positioned within each branch channel and having polarities to permit propagation of magnetic domains within the continuous channel;
   c. a plurality of magnetic domain inhibitors extending from alternating channel branches to adjacent channel branches; and
   d. a hold conductor transversing the vertices of the branch channels and reversing the direction between the inner vertices and the outer vertices.

2. A circulating shift register according to claim 1 wherein the plurality of inhibitors each include:
   a. a fan out channel connected to a branch channel;
   b. a second magnetic domain film coplanar with and opposing the first film; and
   c. a film-to-film transfer junction for transferring the magnetic domain from the first film to the second film.

3. A circulating shift register according to claim 2 wherein the input and output terminals are connected to the vertices.

* * * * *